Montague & Townsend.
Door Plate.

N°. 28,396.    Patented May 22, 1860.

UNITED STATES PATENT OFFICE.

DANL. MONTAGUE, OF NEW BEDFORD, MASSACHUSETTS, AND JAS. TOWNSEND, OF GARDINER, MAINE.

DOOR-PLATE.

Specification of Letters Patent No. 28,396, dated May 22, 1860.

*To all whom it may concern:*

Be it known that we, DANIEL MONTAGUE and JAMES TOWNSEND, the former of New Bedford, in the county of Bristol and State of Massachusetts, and the latter of Gardiner, in the county of Kennebec and State of Maine, have invented a new and useful Improvement in Glass Door-Plates; and we do hereby declare that the following is a full, clear, and exact description of the same, reference being had to the accompanying drawings, forming a part of this specification, in which—

Figure 1:
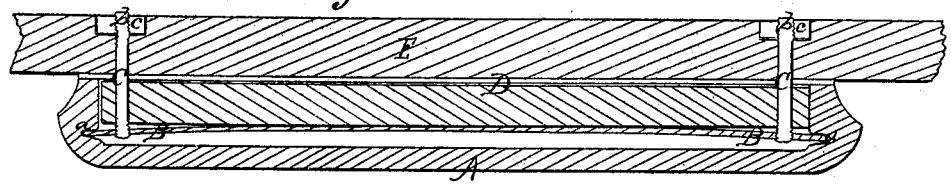
Figure 2:
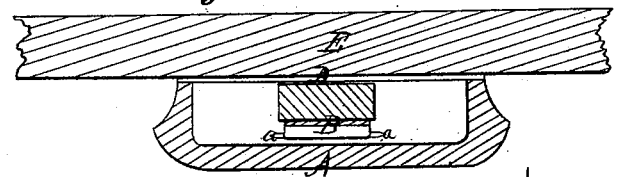
Figure 3:
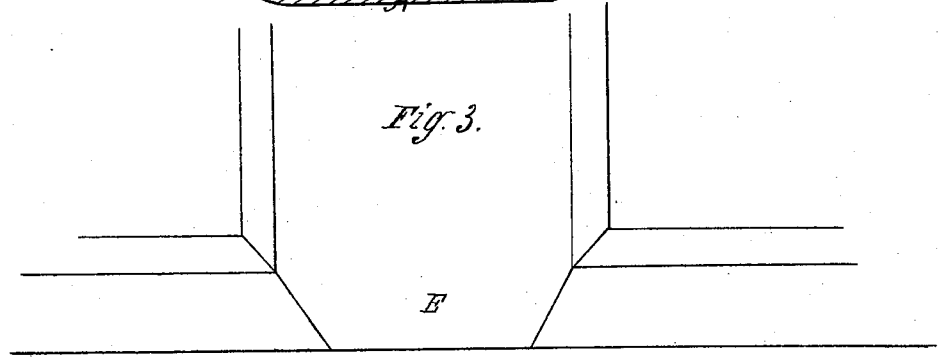
Figure 3:
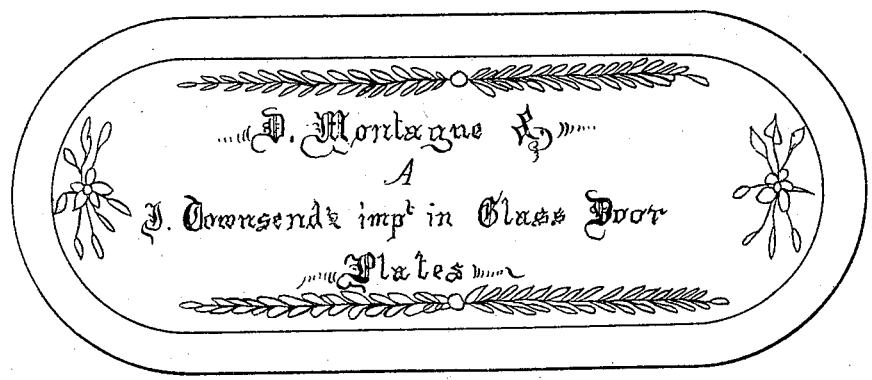
Figure 3:
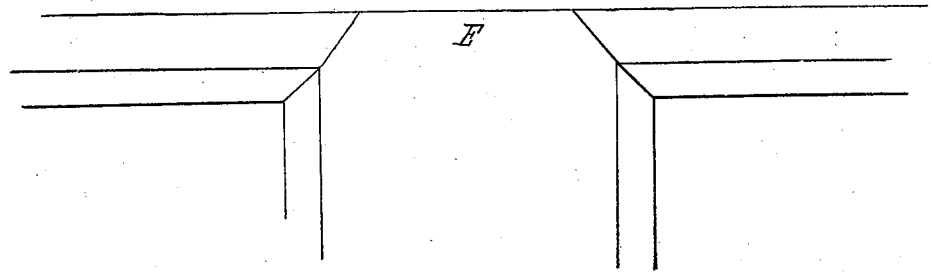

Figure 1 is a horizontal section of our improved door plate. Fig. 2, is a vertical section of the same, and Fig. 3, is a front view.

Similar letters of reference, in each of the several figures indicate corresponding parts.

The nature of our invention consists in the combination of a hollow glass door or name plate, spring fastening strip or bar and elastic mat or cushion, substantially in the manner hereinafter described.

To enable others skilled in the art, to make and use our invention, we will proceed to describe its construction and operation.

A, in the accompanying drawings represents the glass name or door plate. This plate is made hollow or concave and has letters spelling the name of an individual wrought upon it in any of the known ways.

B, is a spring strip arranged in the hollow of the glass plate and connected by its ends to the ends or side edges of the glass plate. It will be observed that narrow vertical grooves $a$, $a$, are formed in the glass, and that the ends of the spring strip enter the same. To thus have the ends of the strip enter the grooves, it is necessary to shorten or bend it into the form of a bow, and then to allow it to resume its original position.

C, C, are two screw bolts, one attached to each end of the strip. These bolts have screw threads $b$, $b$, formed on their upper rear ends for nuts $c$, $c$, to screw on when it is desired to apply the glass plate to a door.

D, is an elastic mat or cushion placed against the back of the spring strip and fitted by means of holes over the screw bolts.

The door plate, thus constructed is applied to the door E, in the manner represented.

It will be seen that by introducing a spring within the hollow of the glass door plate, the use of an outside frame for the glass is unnecessary and besides this in case of contraction in the parts, the spring can be adjusted so as to have all the parts again made firm. Again by using an elastic mat or cushion between the glass plate and the door, the liability of damage to the glass plate from jarring, &c., is greatly lessened and withal a simple and highly ornamental glass door plate is produced.

What we claim as our invention and desire to secure by Letters Patent is—

1. The combination of a hollow glass door or name plate A, spring fastening strip or bar B, and elastic mat or cushion, D, substantially in the manner and for the purpose described.

2. The spring fastening strip (provided with screw bolts) arranged within, the hollow glass door or name plate A, and having its ends confined in grooves $a$, $a$, of the glass plate A, substantially as and for the purpose set forth.

DANIEL MONTAGUE.
JAMES TOWNSEND.

Witnesses:
GILES S. FALES,
PETER FALES,
JOHN B. LECRAW,
DANIEL W. SNELL.